(12) United States Patent
Yang et al.

(10) Patent No.: US 6,345,881 B1
(45) Date of Patent: Feb. 12, 2002

(54) COATING OF PRINTHEAD NOZZLE PLATE

(75) Inventors: Zhihao Yang, Webster; Yung-Rai Lee, Pittsford; Thomas L. Penner; Ravi Sharma, both of Fairport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/408,193

(22) Filed: Sep. 29, 1999

(51) Int. Cl.$^7$ .................................................. B41J 2/135
(52) U.S. Cl. ........................................... 347/45; 347/47
(58) Field of Search ................................ 347/45, 47, 63

(56) References Cited

U.S. PATENT DOCUMENTS

| | | | | |
|---|---|---|---|---|
| 5,148,193 A | | 9/1992 | Inamoto et al. .............. 346/1.1 |
| 5,194,877 A | * | 3/1993 | Lam et al. ..................... 347/63 |
| 5,512,131 A | * | 4/1996 | Kumar et al. ................ 427/123 |
| 5,598,193 A | * | 1/1997 | Halko et al. .................. 347/45 |
| 5,947,027 A | * | 9/1999 | Burgin et al. ................ 101/474 |
| 6,045,710 A | * | 4/2000 | Silverbrook ................... 216/2 |
| 6,096,380 A | * | 8/2000 | Takebe et al. ............... 427/429 |
| 6,142,606 A | * | 11/2000 | Kubota et al. ................. 347/45 |
| 6,183,070 B1 | * | 2/2001 | Hashizume .................. 347/70 |

* cited by examiner

*Primary Examiner*—John Barlow
*Assistant Examiner*—Manish S. Shah
(74) *Attorney, Agent, or Firm*—Harold E. Cole

(57) ABSTRACT

A method for treating a metallic oxide or metallic nitride ink jet printhead nozzle plate comprising stamping the front surface thereof with an anti-wetting agent using an elastomeric stamp.

3 Claims, No Drawings

COATING OF PRINTHEAD NOZZLE PLATE

FIELD OF THE INVENTION

This invention relates to ink jet printing and, more particularly, to a process for coating an ink jet nozzle plate in an ink jet printhead with an anti-wetting agent.

BACKGROUND OF THE INVENTION

An ink jet printer produces images on a receiver by ejecting ink droplets onto the receiver in an imagewise fashion. The advantages of non-impact, low-noise, low energy use, and low cost operation in addition to the capability of the printer to print on plain paper are largely responsible for the wide acceptance of ink jet printers in the marketplace.

In this regard, "continuous" ink jet printers utilize electrostatic charging tunnels that are placed close to the point where ink droplets are being ejected in the form of a stream. The selected ones of the droplets are electrically charged by the charging tunnels. The charged droplets are deflected downstream by the presence of deflector plates that have a predetermined electric potential difference between them. A gutter may be used to intercept the charged droplets, while the uncharged droplets are free to strike the recording medium.

In the case of "on demand" ink jet printers, at every orifice a pressurization actuator is used to produce the ink jet droplet. In this regard, either one of two types of actuators may be used: heat actuators and piezoelectric actuators. With respect to heat actuators, a heater placed at a convenient location heats the ink and a quantity of the ink will phase change into a gaseous steam bubble and raise the internal ink pressure sufficiently for an ink droplet to be expelled to the recording medium. With respect to piezoelectric actuators, a piezoelectric material is used which possesses piezoelectric properties such that an electric field is produced when a mechanical stress is applied. The converse also holds true: that is, an applied electric field will produce a mechanical stress in the material. Some naturally occurring materials possessing these characteristics are quartz and tourmaline. The most commonly produced piezoelectric ceramics are lead zirconate titanate, barium titanate, lead titanate, and lead metaniobate.

A continuing problem with ink jet printers is the accumulation of ink on ink jet nozzle plates, particularly around the orifice from which ink drops are ejected. The result of ink drops accumulating on the nozzle plate surface around the orifice is that it becomes wettable, causing ink drops to be misdirected which degrades the quality of the printed image. To limit or prevent the spreading of ink from the orifice to the nozzle plate, it is common practice to coat the ink jet nozzle plate with an anti-wetting layer. Examples of anti-wetting layers are coatings of hydrophobic polymer materials such as Teflon® and polyimide-siloxane, or a monomolecular layer (self-assembled monolayer) of a material that chemically binds to the nozzle plate. The techniques of coating the nozzle plates have involved solution immersion, spin coating, chemical vapor deposition, and plasma deposition.

It has been discovered that for the "on demand" ink jet printers, of which the ink droplets are driven by a pressurization actuator, an anti-wetting coating on the interior channel walls of the nozzles is undesirable, as it causes the instability of ink release which leads to print quality degradation. Therefore, a method of coating a surface of a nozzle plate with precise location is desirable.

A typical ink-jet printhead is formed out of silicon wafers using orientation-dependent etching techniques to create an array of nozzles on the orifice plate. With modern MEMS (microelectromechanical systems) technology, various thermal and logic transducer components, known as heaters and logic control drivers, can be integrated onto the nozzle plates with designed microstructures located around nozzle orifices. The top surface of such fabricated printheads is composed of silicon oxide which may additionally be coated with a passivation layer of a metallic oxide such as tantalum oxide or a metallic nitride such as silicon nitride.

U.S. Pat. No. 5,598,193 discloses a treatment of the outer surface of a gold-plated nozzle plate with thiols, disulfides, or sulfinates to form a monolayer coating chemically bonded to the gold surface. It is disclosed that a stamp or pad may be used to apply the coating to the nozzle plate. However, there is a problem with this method in that a gold coating is required on the nozzle plate, which is expensive and undesirable.

An object of this invention is to provide a method for treating a metallic oxide or metallic nitride ink jet printhead nozzle plate with an anti-wetting coating on the front face of the nozzle.

SUMMARY OF THE INVENTION

This and other objects are achieved in accordance with the present invention which comprises a method for treating a metallic oxide or metallic nitride ink jet printhead nozzle plate comprising stamping the front surface thereof with an anti-wetting agent using an elastomeric stamp.

By use of the invention, coatings are achieved at the areas desired, and one can also make the coatings with a pattern according to the arrangement of orifices on the nozzle plates.

By using the method of the invention, the anti-wetting coating is applied exclusively to the outer surface of the nozzle plates. An advantage of this process is that it provides an improved non-wetting surface on the nozzle plates around the orifices to prevent ink spread. In addition, since the anti-wetting coating is not deposited on the channel walls of the nozzle, the ink drops are ejected in a reproducible manner.

DETAILED DESCRIPTION OF THE PREFERRED EMBODIMENTS

In a preferred embodiment of the invention, the surface of the elastomeric stamp has a relief pattern to print on the printhead nozzle plate in a desired location. This relief pattern is made by pre-molding the stamp with the designed patterns according with the arrangement of orifices on the nozzle plates. In another preferred embodiment of the invention the anti-wetting agent chemically bonds to the surface of the metallic oxide or metallic nitride. In yet another preferred embodiment of the invention, the metallic oxide is silicon oxide and the metallic nitride is silicon nitride.

A nozzle plate for a conventional ink jet printhead preferably comprises a silicon wafer constructed by conventional etching techniques which has a metallic oxide or nitride coating. It should be appreciated that other materials beside silicon wafer, such as electro-formed nickel, may be used to form the underlying nozzle plate as is known in the art. Further other metals such as silver, palladium and copper may be used to coat the underlying nozzle plate material. The plate includes an array of orifices through which ink is ejected. An anti-wetting coating on the front face of the nozzle plate is prepared by using a fabricated "rubber stamp" made of an elastomeric material. Examples of such elastomeric materials include polydimethylsiloxane, polyurethane, polybutadiene, polyisoprene, polyisobutylene and copolymers of styrene and butadiene.

The wetting character of surface of the ink jet nozzle plate is conventionally defined by the size of the contact angle between an ink drop and the test surface. Contact angles are conventionally measured by placing a 1–2 mm diameter liquid drop on a test surface and measuring the angle between the liquid and solid using a contact angle goniometer. A surface is considered anti-wetting if the contact angle between the ink and the surface is approximately 90° or greater. While an anti-wetting coating on surface of nozzle plate to prevent ink-spread is desirable, the coatings at the nozzle rims and walls of the inside channels often cause instability of the ink stream and hence degrade the printing quality. However, conventional methods to form alkylsilane coatings on a printhead wafer surfaces including solution immersion, spin coating, chemical vapor deposition, and plasma deposition, generally lack the control to avoid the coating materials getting into the nozzle.

In accordance with the present invention, the anti-wetting coatings are designed to avoid the nozzle channels and rims. The elastomeric stamp can be fabricated by the micromolding technique against a master chip, which could be, but is not limited to, a wafer with a negative image of the printhead.

In preferred embodiments of the invention, the anti-wetting coating compounds are alkyl or fluoroalkyl silane compounds and may be represented by the formula:

$$R_n SiX_m$$

wherein:
  each R independently represents a substituted or unsubstituted alkyl, aryl, fluoroalkyl or arylfluoroalkyl group having from about 2 to about 30 carbon atoms;
  each X independently represents halogen such as chlorine, or an alkoxy group having from 1 to about 3 carbon atoms;
  n and m are integers from 1 to 3, with the proviso that n+m=4.

In accordance with the invention, a solution of the anti-wetting coating compound with the preferred concentration from 0.01% to 20% is applied to the molded stamp surface. By aligning precisely the stamp to the target printhead, the stamp is applied to the nozzle plate surface with a positive pressure. The patterned anti-wetting coatings of silanes are cured preferably at 100° C. for 20 minutes. Such coatings are found to be robust to most mechanical wiping and strong ultrasonic cleaning.

The printheads with the aforementioned coatings are found to exhibit significant improvement of anti-ink-droplet spread and a great increase in printing lifetime. In comparison with the printheads which have the coatings not only on the outer surface but also on internal walls of the channels, the printheads coated in accordance with the present invention demonstrate a significant improvement in the stability of ink droplet ejection.

The invention will be further illustrated by the following examples:

EXAMPLE 1

Forming Stamps

A stamp was prepared using Dow-Corning Co. Sylgard® Silicone Elastomer-184 kit. A 10:1 ratio mixture of Sylgard® 184 and its curing agent are poured into a glass petri dish. After an even distribution of the viscous liquid over the dish, the material is kept at 50° C. over night for curing to the solid elastomer. A razor blade is used to cut the elastomer sheet into 0.25 cm x0.5 cm stamps. The stamps are soaked in ethanol for over night to remove the unreacted polymers, and then vacuum dried and stored for future use.

EXAMPLE 2

Coatings of Anti-wetting Agent on Silicon Wafer Surface

A 1% solution of an anti-wetting agent, heptadecafluoro-1,1,2,2-tetrahydrodecyl trichlorosilane ($C_{10}F_{17}H_4SiCl_3$, from Gelest Inc.) in decane was to used as the coating solution. Two kinds of silicon wafers, one with a silicon oxide surface and the other silicon nitride, are used to simulate a nozzle plate material. Both wafers were treated with oxygen plasma prior to coating.

The solution was applied to a stamp of Example 1 and dried in a stream of nitrogen. The stamp was then gently placed on the above wafer substrates, and a light pressure applied to ensure a good contact. The stamp was removed after 2 minutes and the coatings cured in an oven at 100° C. for 20 minutes. Finally, the surfaces were cleaned with decane or hexadecane and aqueous detergent solution by either ultrasonication or mechanical wiping with a soft brush.

The effectiveness of the anti-wetting coating on each of the substrates was evaluated using water contact angles. If a coating has anti-wetting properties, then it will repel aqueous inks and therefore suppress contamination of a nozzle plate by an aqueous ink. Thus a coating with high anti-wetting properties is desirable.

A surface is considered anti-wetting if the contact angle between water and the test surface is approximately 90° or greater. The contact angles of water on the coatings were measured with a contact angle goniometer. The following results were obtained:

TABLE 1

| Substrate Surface | Water Contact Angle (°) | |
| --- | --- | --- |
| | Before Coating | After Coating |
| Silicon Oxide | 10 | 109 |
| Silicon Nitride | 25 | 106 |

The above results show that application of an anti-wetting agent using the stamping technique of the invention was effective in providing a high water contact angle thus indicating a non-wetting surface.

The above coatings were tested for robustness by wiping with a polyurethane blade and immersion in an ultrasonic bath for two hours. No change in water contact angle was observed.

EXAMPLE 3

Coating of Anti-wetting Agent on Printhead Nozzle Plate

A printhead nozzle plate with a silicon nitride layer was coated with the anti-wetting agent using the stamping procedure described in Example 2. The printhead nozzle plate was tested by ejecting a copper phthalocyanine tetrasulfonic acid tetrasodium aqueous ink through the nozzles of the printhead. A comparison example was prepared by merely immersing the printhead in a 1% solution of heptadecafluoro-1,1,2,2-tetrahydrodecyl trichlorosilane in decane.

The effectiveness of the anti-wetting coating was evaluated in terms of reproducible ink drop size, formation of unwanted "satellite" drops and regularity in time and direction of drop ejection.

Initial Quality of Drop Formation and Ejection

The printheads were evaluated for initial quality of drop formation and ejection using a ranking system from 1 to 4, which are defined as follows:

TABLE 2

| Rank | Initial Quality of Drop Formation and Ejection |
|---|---|
| 4 | Drop formation was normal; no unwanted "satellite" drops were created; no change in drop size was observed; drop ejection was regular and had no misdirection. |
| 3 | Drop ejection was steady and had no misdirection; no change in drop size, but some "satellite" drops were observed. |
| 2 | Some misdirection of drops was found, but drop size was constant |
| 1 | Drop size was irregular; ejection was uncontrollable |

Repeatability of Drop Formation and Ejection Over a Period of Time

The repeatability of ink drop formation and ejection was evaluated over time. The test results are characterized by a rate ranking system from 1 to 4, where 4 represents good or normal drop formation for >$10^7$ drops ejected, 3 is $10^5$–$10^7$ drops ejected, 2 is $10^3$–$10^5$ drops ejected and 1 is <$10^3$ drops ejected.

Mechanical Durability of the Anti-Wetting Coating

The mechanical durability of the anti-wetting coating was evaluated by wiping the printhead nozzle plate with a soft tissue and observing drop formation and ejection as above. The test results were characterized by a rate ranking system from 1 to 4, where 4 represents no deterioration of nozzle performance for more than 10 wipes, 3 is 5–10 wipes, 2 is 2–5 wipes and 1 is 1 wipes or less.

The following results were obtained:

TABLE 3

| Printhead Nozzle Plate Surface | Initial Quality | Repeatability | Durability |
|---|---|---|---|
| Uncoated (Control) | 4 | 2 | 2 |
| Immersion-Coated (Comparison) | 1 | — | — |
| Stamp-Coated (Invention) | 4 | 4 | 4 |

The above results show that in comparison with an uncoated or immersion-coated printhead nozzle plate surface, the printhead nozzle plate of the invention had high initial quality, repeatability and durability.

Although the invention has been described in detail with reference to certain preferred embodiments for the purpose of illustration, it is to be understood that variations and modifications can be made by those skilled in the art without departing from the spirit and scope of the invention.

What is claimed is:

1. A method for treating a silicon oxide or silicon nitride ink jet printhead nozzle plate comprising stamping the front surface thereof with an anti-wetting agent using an elastomeric stamp, said anti-wetting agent having the following formula:

$$R_n SiX_m$$

wherein:
each R independently represents a substituted or unsubstituted alkyl, aryl, fluoroalkyl or arylfluoroalkyl group having from about 2 to about 30 carbon atoms;
each X independently represents halogen or an alkoxy group having from 1 to about 3 carbon atoms; and
n and m are integers from 1 to 3, with the proviso that n+m=4.

2. The method of claim 1 wherein the surface of said elastomeric stamp has a relief pattern to print on said printhead nozzle plate in a desired location.

3. The method of claim 1 wherein said anti-wetting agent chemically bonds to the surface of said silicon oxide or silicon nitride.

* * * * *